US007925159B2

(12) United States Patent
Dove

(10) Patent No.: US 7,925,159 B2
(45) Date of Patent: Apr. 12, 2011

(54) NON-DIRECTIONAL LASER-BASED SELF-PROTECTION

(75) Inventor: Webster Dove, Nashua, NH (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 1102 days.

(21) Appl. No.: 11/436,423

(22) Filed: May 18, 2006

(65) Prior Publication Data

US 2007/0236382 A1 Oct. 11, 2007

Related U.S. Application Data

(60) Provisional application No. 60/682,142, filed on May 18, 2005.

(51) Int. Cl.
*H04K 3/00* (2006.01)
(52) U.S. Cl. .......................................... 398/39
(58) Field of Classification Search .............. 398/39, 398/186
See application file for complete search history.

(56) References Cited

U.S. PATENT DOCUMENTS

| | | | |
|---|---|---|---|
| 6,587,486 B1 | 7/2003 | Sepp et al. | |
| 6,707,052 B1 * | 3/2004 | Wild et al. | 250/504 R |
| 6,825,791 B2 * | 11/2004 | Sanders et al. | 342/14 |
| 6,850,152 B1 * | 2/2005 | Woodall et al. | 340/332 |
| 7,104,496 B2 | 9/2006 | Chang | |
| 7,212,148 B1 | 5/2007 | Torres | |
| 7,402,818 B2 * | 7/2008 | Forsyth et al. | 250/492.1 |

OTHER PUBLICATIONS

"Countermeasure Systems" Edited by David H. Pollock, SPIE, 1993, pp. 235-286.*
J. Sanghera et al., "IR Fiber Optics Development in the Naval Research Laboratory", Proceedings of SPIE vol. 3950, 2000.*
Per International Search Report mailed Jan. 29, 2008 of International Application # PCT/US2007/14637.

* cited by examiner

*Primary Examiner* — Shi K Li
(74) *Attorney, Agent, or Firm* — Daniel J. Bourque; Bourque and Associates

(57) ABSTRACT

A missile or other weapons countermeasure system includes a non-directional, modulated laser energy signal designed to protect an object (such as an aircraft, land vehicle, building, or vessel). Once a potential threat has been detected, a laser energy source generates a laser energy signal of sufficient power to provide the necessary coverage. The laser energy is modulated using an oscillator to create the appropriate countermeasure signal. Next, fiber optics or other coupling device distribute the modulated laser energy signal to one or more apertures, preferably wide angle lenses or the like, disposed about the outer surface of the object to be protected. The number and location of the apertures will depend upon the circumstances of the installation as well as the desired coverage.

8 Claims, 3 Drawing Sheets

NON-DIRECTIONAL LASER-BASED SELF-PROTECTION

RELATED APPLICATION

This application is related to and claims priority from U.S. provisional Application No. 60/682,142 filed May 18, 2005 entitled Non-Directional Laser-Based Self-Protection which is incorporated fully herein by reference.

TECHNICAL FIELD

The present invention relates to self-protection from guided weapons and more particularly, relates to a laser-based non-directional self-protection system and method.

BACKGROUND INFORMATION

The threat to aircraft (both military as well as civilian aircraft), land-based vehicles (such as tanks, large trucks, trains, and the like), as well as ships from surface-to-air missiles (SAMS), man portable air defense systems (MAN-PADS), and the like has long been recognized and is ever increasing. The break-up of many countries as well as the increased supply and reduced cost of these various weapon systems has lead to the proliferation of these missile-based systems into the hands of people who wish to do serious harm with them. Large, slow moving and poorly maneuverable objects such as large aircrafts (for example, cargo planes and large civilian planes), ships, and trains are particularly vulnerable.

There are several known systems and methods of missile countermeasures. One such known system includes a non-directional infrared system. These systems generally include a lamp (such as a hot carbon lamp or the like) disposed within a housing having a rotatable shutter. The shutter includes a plurality of lenses that are rotated about the housing to produce a pulsed infrared signal designed to confuse the approaching missile.

One of the benefits to these systems is that they are typically fairly low in cost compared to other known systems. Another benefit is that these systems are non-directional. As a result, these systems do not need to track the approaching missile or aim/point the jamming signal towards the approaching missile.

Unfortunately, these known systems suffer from several problems. One such problem is that the rotating housing is maintenance prone. This is particularly a problem in areas with large amounts of dirt and sand. For example, it is a well established fact that during Operation Desert Storm, sand often became jammed within the rotating housing, causing a great deal of maintenance issues and sometimes malfunction.

Another problem associated with these known systems is that the output of the lamp is often not sufficient to confuse the missiles with sufficient time to avoid collision. This is particularly a problem with fast moving missiles as well as large, slow moving ships, trains, and airplanes. A further problem with the known systems is that that color match of the jamming signal (i.e., the frequency of the jamming signal) cannot be adjusted sufficiently to confuse many modern missiles. Newer, modern missiles have ever-increasingly improving counter-countermeasure (CCM) capabilities designed to reduce, diminish, or eliminate the CCM effectiveness of many known countermeasure systems. In order to jam modern missiles, the jamming signal must be very precise. As a result, the known systems may not be capable of jamming many modern missiles.

Yet another problem with the known systems is that the rotating assemblies are large and bulky. This generates a packaging issue since a rotating assembly must be secured to the object being protected. Moreover, the size of the rotating assembly increases the likelihood of the rotating assembly becoming damaged.

Another known countermeasure system includes laser-based directional jamming systems. These systems generate a modulated laser beam that is aimed directly at the sensors of the approaching missile in order to confuse the missile's guiding system. These laser-based directional jamming systems provide increased color match compared to the non-directional infrared countermeasure systems, thus are more effective against modern missiles.

These laser-based directional systems also suffer from several problems. One problem is that the systems are relatively expensive compared to the non-directional infrared systems. The added cost is partially due to the fact that laser-based directional systems must be able to track the approaching missile. Not only does this require a tracking system, but it also requires a movable and rotatable housing to allow the laser beam to be precisely aimed at the missile's guidance system (typically at the cone or head of the missile). Consequently, the rotatable housing is subject to many of the maintenance issues discussed above.

Accordingly, there exists a need for a system and method of jamming modern missiles that is preferably low enough in cost to make it more available to the civilian sector. The system and method should be capable of generating a jamming signal with a high degree of precision and accuracy. The use of complex, bulky, and maintenance intensive movable housings should also preferably be avoided and the system and method should also preferably not require complex and expensive tracking devices.

It is important to note that the present invention is not intended to be limited to a system or method which must satisfy one or more of any stated objects or features of the invention. It is also important to note that the present invention is not limited to the preferred, exemplary, or primary embodiment(s) described herein. Modifications and substitutions by one of ordinary skill in the art are considered to be within the scope of the present invention, which is not to be limited except by the following claims.

SUMMARY

The present invention features a countermeasure system for protecting an object, such as aircraft, land vehicles, buildings, and vessels, from potential weapons, such as missiles and the like. According to one embodiment, the countermeasure system includes a laser energy source, and oscillator, and an aperture. The laser energy source, preferably a single laser source, generates a laser. The oscillator modulates the laser generated by the laser source to create a countermeasure signal. The countermeasure signal is then distributed to an aperture disposed proximate an outer surface of the object, preferably using fiber optics or the like. The aperture, preferably a wide-angle lens, emits the countermeasure signal in a non-directional manner.

According to the preferred embodiment, the countermeasure system includes a plurality of apertures disposed about the outer surface of the object. The countermeasure system may include a single oscillator. Alternatively, a plurality of oscillators each connected to at least one aperture may be used. According to this embodiment, the plurality of oscillators independently modulate the laser to create a plurality of independent countermeasure signals.

In a further embodiment, the countermeasures system includes a controller. The controller detects the presence of a potential weapon and determines an appropriate countermeasure signal. In the exemplary embodiment, the controller tracks the potential weapon and directs an appropriate aperture to emit the countermeasure signal.

According to another embodiment, the present invention features a weapon countermeasure system for defeating a potential weapon and includes a controller. The controller detects the presence of a potential weapon and determines an appropriate signal to be emitted. At least one oscillator, responsive to the controller, modulates a laser generated by a laser energy source to create the signal to be emitted. At least one non-directional aperture, preferably a wide-angle lens, is disposed proximate an outer surface of an object to be protected. The aperture is connected to the oscillator using fiber optics and non-directionally emits the modulated laser signal.

The present invention also features a method of protecting an object from a potential weapon. The method includes detecting the presence of a potential weapon and determining an appropriate countermeasure signal to prevent the potential weapon from hitting the object to be protected based upon the type of potential weapon.

Once the appropriate countermeasure signal has been determined, a laser is generated by a laser energy source and is modulated to create at least one countermeasure signal based upon the type of potential weapon detected. Next, the countermeasure signal is distributed to at least one aperture, preferably using fiber optics or the like. Lastly, the countermeasure signal is emitted from the aperture in a non-directional manner.

A plurality of different countermeasure signals may be simultaneously generated in order to defeat a plurality of different weapons simultaneously approaching. These different countermeasure signals may be distributed to one or more apertures disposed about the object to be protected base upon the information collected.

BRIEF DESCRIPTION OF THE DRAWINGS

These and other features and advantages of the present invention will be better understood by reading the following detailed description, taken together with the drawings wherein.

DETAILED DESCRIPTION OF THE PREFERRED EMBODIMENTS

Figure 1:
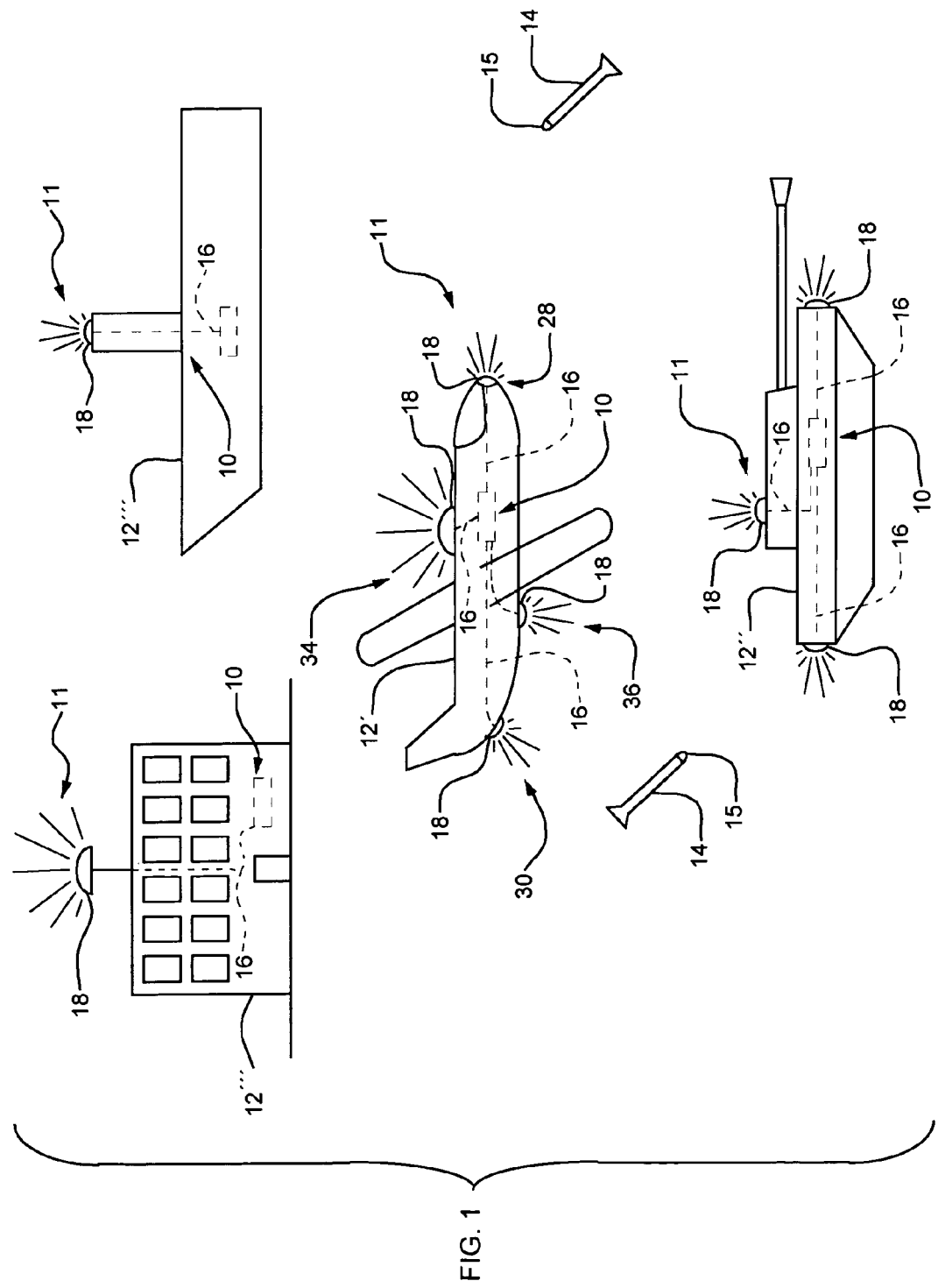
FIG. 1 is a plan view of one embodiment of the present invention in combination with several types of objects to be protected.

The countermeasure system 10, FIG. 1, according to the present invention, is designed to protect an object 12 such as, but not limited to, manned and un-manned aircrafts 12', land vehicles 12" (such as tanks, trains, trucks, and the like), ships 12''', as well as buildings 12$^{iv}$ and the like from guided objects or weapons, such as missiles, 14. The countermeasure system 10 emits a non-directional signal 11 that tricks, confuses, or defeats the guidance system 15 of the missile 14 such that the missile 14 is unable to inflict damage upon the object 12.

Figure 2:
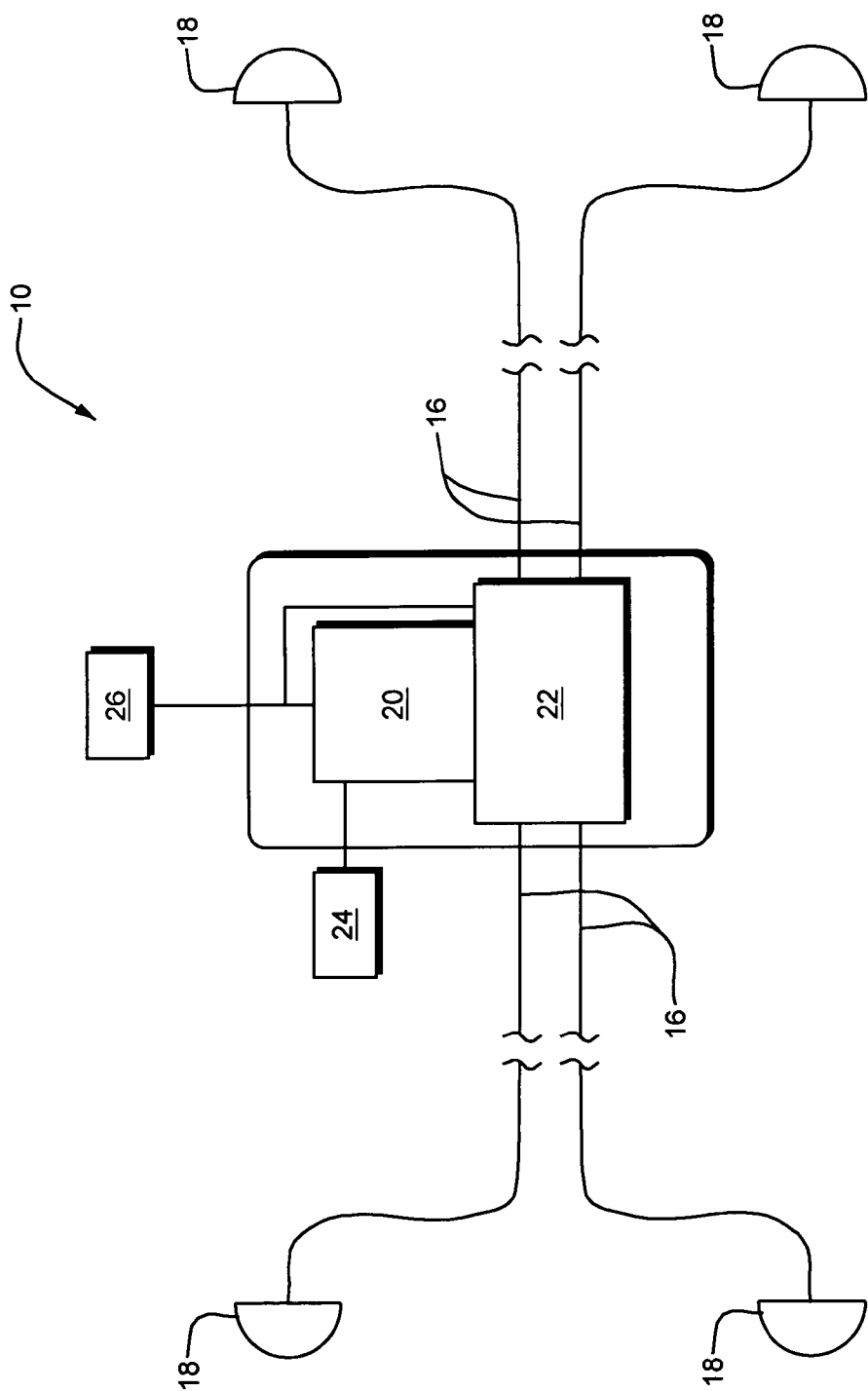
FIG. 2 is a schematic view of another embodiment of the countermeasure system according to the present invention.

The countermeasure system 10, FIG. 2, and method 300 (FIG. 3) preferably includes a power source 24 and a controller 26. The controller 26 may include any known device that determines the presence of a missile 14, activates the countermeasure system 10 and determines the type(s) of incoming missiles 14 (act 310, FIG. 3) such that an appropriate non-directional jamming signal 11 can be generated (act 320, FIG. 3) as will be discussed in greater detail hereinbelow.

Figure 3:
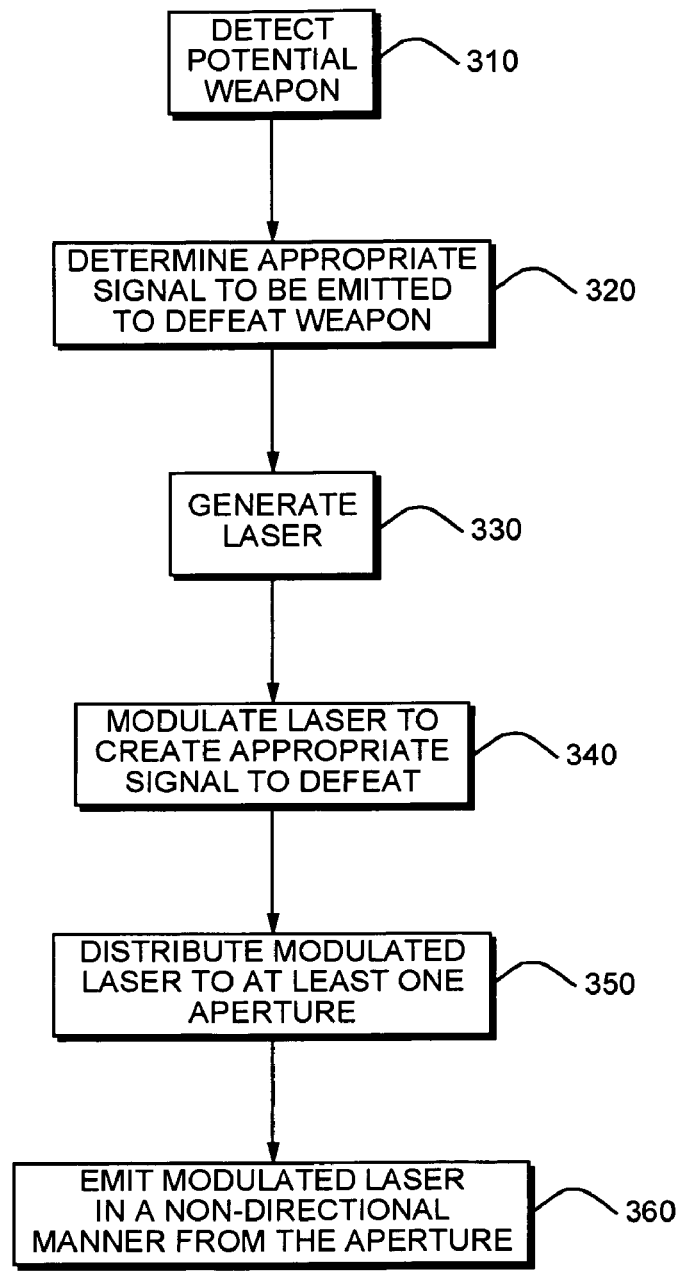
FIG. 3 is a flow chart illustrating one embodiment of the countermeasure method according to the present invention.

The countermeasure system 10 also includes at least one laser source or generator 20 generating a laser signal (act 330, FIG. 3). The laser source 20 must be sufficiently powerful to generate a non-directional signal 11 capable of providing adequate coverage about the object 12. In the exemplary embodiment, the laser source 20 is preferably capable of generating a laser having approximately 100-10,000 watts. Laser sources 20 sufficient to generate a laser of sufficient strength are well known to those skilled in the art. While the present invention may include multiple laser sources 20, the use of a single laser source 20 may be sufficient and is will reduce the overall cost and size of the countermeasure system 10.

The laser source 20 is preferably connected to at least one modulator/oscillator 22 in any manner known to those skilled in the art. The oscillator 22 modulates the laser signal (act 340, FIG. 3) generated by laser source 20 in order to create the non-directional jamming signal 11. The particulars of the oscillator 22 are well within the knowledge of one skilled in the art, and of course will depend upon the intended types of missiles 14 which the countermeasure system 10 is intended to protect against.

The use of multiple oscillators 22 allows the countermeasure system 10 to jam multiple different targets simultaneously (for example, multiple types of incoming missiles 14), and is within the knowledge of one skilled in the art. For example, tracking information from the controller 26 can be used to direct the appropriate modulated laser signal to a particular aperture 18. As will be discussed hereinbelow, while this embodiment "directs" the modulated laser signal to a particular aperture 18, it is still non-directional as that term is used herein and in the art. In the preferred embodiment, the oscillator 22 preferably yields about a 4-5 micron light source.

The output of the oscillator 22 is preferably distributed (act 350, FIG. 3) to at least one aperture 18 disposed about an exterior region of the object 12. In the preferred embodiment, fiber optics 16 are used to distribute the output of the oscillator 22. The aperture 18 emits (act 360, FIG. 3) the modulated laser signal in a non-directional manner. As used herein, "non-directional" is intended to mean that the modulated laser signal is not aimed directly at a potential weapon 14.

The number and types of apertures 18 will vary greatly depending upon the specific circumstances of the installation. For example, the number and types of apertures 18 will depend upon the desired coverage (for example 360 degree coverage or 180 degree coverage) as well as the physical constraints of the object 12 which the countermeasure system 10 is to protect. It is envisioned that a plurality of apertures 18 will typically be employed to create. The desired coverage, though again this is not a limitation of the present invention.

For exemplary purposes only, a typical aircraft 12', FIG. 1, might employ an aperture 18 proximate the nose 28 of the aircraft 12', an aperture 18 disposed proximate the tail section 30, as well as apertures 18 disposed about a top and bottom surface 32, 34. These apertures 18 are preferably connected to a central laser source 20 using fiber optics 16. This arrangement of apertures 18 would provide a complete, 360-degree, spherical coverage about the aircraft 12', thereby protecting against missiles 14 coming from all directions. Alternatively, since it is likely that missiles 14 will only be approaching from above, in front or, or behind land vehicles 12" (such as tanks and the like) and ships 12''', it is envisioned that a single aperture 18 providing a 180 degree, hemi-spherical coverage pattern may be utilized. This, of course, assumes that the aperture 18 can be positioned in an unobstructed manner, which may or may not be possible. Also, redundant or backup aperture 18 may also be desirable.

In the exemplary embodiment, the apertures 18 include lenses such as wide angle or fish-eye lenses. These lenses can provide a wide dispersion pattern, thus reducing the number of lenses needed to provide adequate coverage.

One benefit of the countermeasure system 10 is that the countermeasure system 10 is non-directional and therefore does not require the use of expensive and complex tracking and aiming systems. While it may be desirable to use tracking and aiming systems with the present invention, especially in situations where multiple types of missiles 14 may likely be simultaneously fired, it is not mandatory unlike the prior art directed laser systems discussed above.

Additionally, the countermeasure system 10 does not need to have any rotating assembles. As discussed above, these rotating assembles are maintenance intensive and do not work particularly well in certain environments (for example, desert environments) as well as on certain objects 12. Moreover, the use of apertures 18 results in a smaller emitting assembly, thereby allowing the countermeasure system 10 to be more easily adapted and installed on a wide variety of objects 12.

Because the countermeasure system 10 uses a laser source 20 and oscillator 22 to generate the non-directional jamming signal 11, the countermeasure system 10 is capable of more closely matching the required jamming signal of modern missiles 14, thereby increasing the countermeasure system's 10 ability to protect against the CCM capabilities of modern missiles 14.

Accordingly, the present invention provides a novel laser-based non-directional self-protection system and method system useful on many different types of objects and in many conditions.

As mentioned above, the present invention is not intended to be limited to a system or method which must satisfy one or more of any stated or implied object or feature of the invention and should not be limited to the preferred, exemplary, or primary embodiment(s) described herein. Modifications and substitutions by one of ordinary skill in the art are considered to be within the scope of the present invention, which is not to be limited except by the following claims.

The invention claimed is:

1. A countermeasure system for protecting an object comprising:
    an object to be protected by a countermeasure system; and
    a countermeasure system, said countermeasure system including:
    a single stationary laser energy source, said single stationary laser energy source configured for generating laser energy in response to a control signal from a controller;
    at least one oscillator, coupled to said single stationary laser source, and responsive to said generated laser energy and to an oscillator control signal from said controller, far modulating said laser energy and for distributing an output of said oscillator as a countermeasure signal to one or more selected apertures;
    a plurality of apertures disposed proximate an outer surface of said object to be protected by said countermeasure system, each said plurality of apertures connected to said oscillator and configured for receiving said countermeasure signal and far emitting said countermeasure signal in a non-directional manner; and
    a controller, said controller configured for detecting the presence of a potential weapon and for responsive to detection of the presence of a potential weapon, for determining an appropriate countermeasure signal, and responsive to said determination of an appropriate countermeasure signal, for directing said single stationary laser energy source to generate laser energy and for providing said oscillator control signal causing said oscillator to modulate said laser energy, and further wherein said controller tracks said potential weapon and responsive to said tracking, directs at least one appropriate aperture from among said plurality cf apertures to emit said countermeasure signal, for distributing an output of said oscillator as a countermeasure signal to said at least one appropriate aperture from among said plurality of apertures.

2. The countermeasure system as claimed in claim 1 wherein said at least one aperture includes a wide-angle lens.

3. The countermeasure system as claimed in claim 1 wherein said countermeasure system includes a single oscillator.

4. The countermeasure system as claimed in claim 1 wherein said countermeasure system includes a plurality of oscillators each connected to at least one aperture, wherein said plurality of oscillators independently modulate said laser energy generated by laser energy source to create a plurality of independent countermeasure signals.

5. The countermeasure system as claimed in claim 1 wherein said object is selected from the group consisting of, aircraft, land vehicles, buildings, and vessels.

6. A weapon countermeasure system for an aircraft, for defeating a potential weapon, said weapon countermeasure system comprising:
    an aircraft; and
    a weapon countermeasure system disposed on said aircraft, said weapon countermeasure system including:
    a controller, said controller configured for detecting the presence of a potential weapon and for determining an appropriate countermeasure signal to be emitted;
    a single stationary laser energy source, wherein said single stationary laser energy source is configured for generating laser energy in response to a control signal from said controller;
    a plurality of oscillators, each oscillator connected to at least one non-directional aperture, wherein said plurality of oscillators independently modulate said laser energy generated by laser energy source to create a plurality of independent and appropriate countermeasure signals;
    a plurality of non-directional apertures disposed about an outer surface of said aircraft, said plurality of apertures connected to said plurality of oscillators and configured for receiving said countermeasure signal and for emitting said countermeasure signal in a non-directional manner; and
    wherein said controller is coupled to said single stationary laser energy source and to said plurality of oscillators, and wherein said controller is responsive to said detection of the presence of said potential weapon, for tracking said potential weapon, for selecting at least one aperture to which a countermeasure signal should be provided and for controlling said single stationary laser energy source and at least one of said plurality of oscillators to provide to said at least one selected aperture from among said plurality of apertures said countermeasure signal, said controller configured to determine said at least one selected aperture based upon said detection and tracking of said potential weapon.

7. The weapon countermeasure system as claimed in claim 6 wherein said at least one aperture includes a wide-angle lens.

8. A method of protecting an object from a potential weapon comprising the acts of:
- detecting the presence and location of a potential weapon;
- responsive to said act of detecting the presence and location of said potential weapon, determining an appropriate countermeasure signal to be emitted by a countermeasure system from an object to be protected, wherein said countermeasure signal will prevent said potential weapon from hitting said object to be protected;
- generating a single laser energy signal from a single stationary laser energy source;
- responsive to said act of determining an appropriate countermeasure signal to be emitted, modulating said laser energy signal to create a plurality of different modulated laser energy signals;
- distributing said plurality of different modulated laser energy signals to a plurality of apertures based on the location of said potential weapon using fiber optics; and
- emitting said modulated laser energy signal from said plurality of apertures in a non-directional manner to provide said countermeasure signal.

* * * * *

UNITED STATES PATENT AND TRADEMARK OFFICE
CERTIFICATE OF CORRECTION

PATENT NO. : 7,925,159 B2  Page 1 of 1
APPLICATION NO. : 11/436423
DATED : April 12, 2011
INVENTOR(S) : Webster Dove It is certified that error appears in the above-identified patent and that said Letters Patent is hereby corrected as shown below:

Column 5, line 59, replace "far" with "for";

Column 5, line 66, replace "far" with "for"; and,

Column 6, line 12, replace "cf" with "of".

Signed and Sealed this
Nineteenth Day of March, 2013

Teresa Stanek Rea
*Acting Director of the United States Patent and Trademark Office*